(No Model.)

J. JOHNSON.
ROTARY WATER METER.

No. 264,702. Patented Sept. 19, 1882.

Attest:
Courtney A. Cooper
Josephine Campbell

Inventor:
J. Johnson
By his attorney
Charles E. Foster

N. PETERS. Photo-Lithographer, Washington, D. C.

UNITED STATES PATENT OFFICE.

JONATHAN JOHNSON, OF LOWELL, MASSACHUSETTS.

ROTARY WATER-METER.

SPECIFICATION forming part of Letters Patent No. 264,702, dated September 19, 1882.

Application filed March 7, 1882. (No model.)

*To all whom it may concern:*

Be it known that I, JONATHAN JOHNSON, a citizen of the United States, and a resident of the city of Lowell, in the county of Middlesex and State of Massachusetts, have invented certain new and useful Improvements in Fluid-Meters, of which the following is a specification.

My invention relates to that class of fluid-meters in which a bladed wheel is revolved by the force of an injected current, and by its motion drives the registering mechanism; and my invention consists of appliances constructed, as fully described hereinafter, so as to avoid friction, insure great accuracy, and facilitate adjustment to vary the action according to the pressure.

Figure 2:
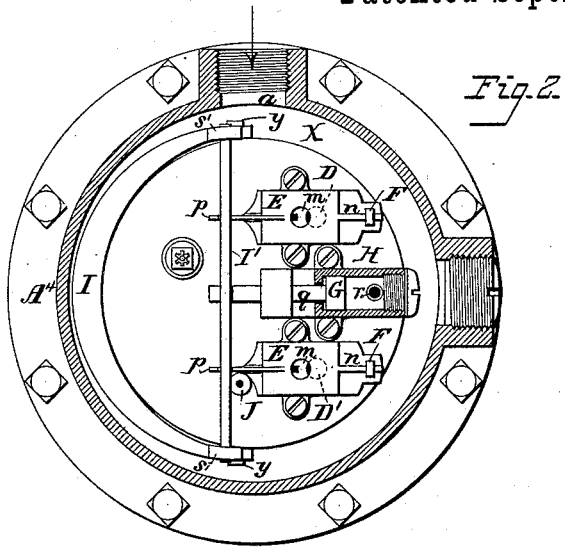
Figure 1:
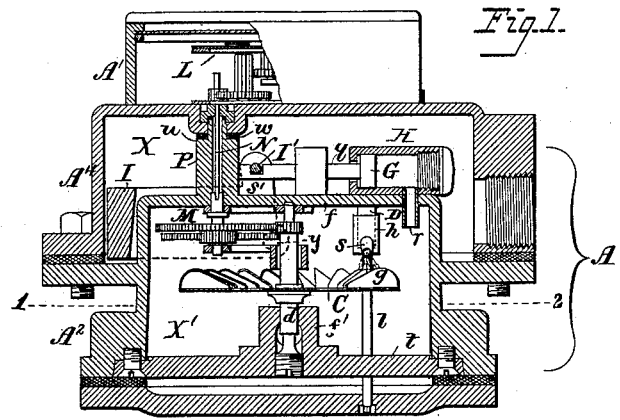
Figure 3:
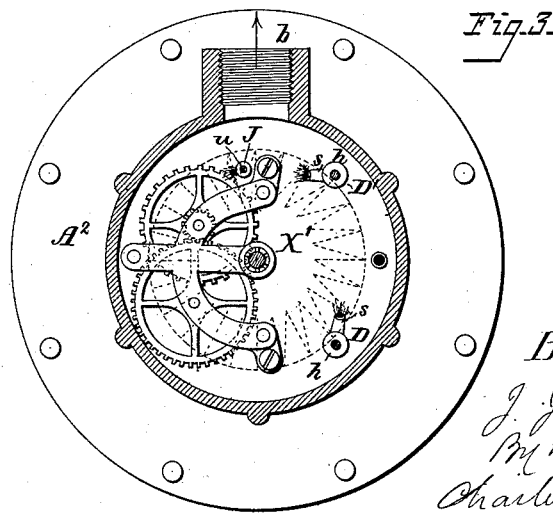

In the drawings, Figure 1 is a sectional elevation of a fluid-meter with my improvements. Fig. 2 is a part sectional plan. Fig. 3 is an inverted plan in section on the line 1 2, Fig. 1.

The general features of my improved meter are similar to those of the meter patented to me April 23, 1878, there being a box, A, composed of a case, $A^2$, and cap $A^4$, and inclosing two chambers, X X', and a closed box, A', at the top, covering suitable registering mechanism. The inlet-opening $a$ communicates with the chamber X, and the outlet $b$ with the chamber X', and in the latter is arranged the bladed wheel C, the spindle $d$ of which communicates motion to the registering apparatus and turns in bearings in the partition $f$, separating the chambers X X', and in a step, $f'$, on a cross-bar, $t$. The blades $g$ of the wheel C are constructed as shown, being inclined to one side, so that the wheel will turn in that direction with but little friction under the influence of streams of water directed from tubes D D' from the opposite sides into the pockets formed by the blades. The tubes D D' communicate with the chamber X, and project, as shown, into the chamber X', and each is provided with a cap, $h$, having an opening or nozzle, $s$, which cap may be adjusted so as to alter the angle at which the stream strikes the wheel, thereby varying the speed of the latter, so that by a little manipulation the register will be made to indicate with precision the quantity of water passed through the meter. It will be apparent that one, two, or more tubes D may be used in proportion to the quantity of water to be measured.

To facilitate adjustment, the caps $h$ may be combined with appliances for moving them from outside of the meter. I have devised different means for this purpose. That shown consists of spindles $l$, secured to the caps and extending to the outside of the casing, each with a square head or slot to receive a key. Seals may be placed over the heads after adjustment.

To insure accurate measurement the strength, size, or velocity of the working stream or streams injected against the wheel C should be in proportion to the water discharged through the meter, for which purpose I use valves E for regulating the amount of water passing to and through the tubes D D', and a regulator whereby these valves are opened as the amount of water required is increased. Each valve is a flat sliding plate with an opening, $m$, which may be brought to coincide with the opening in the tube below. The valve is guided by a rod, $n$, extending through an opening much larger than the rod in a post, F, and by a blade, $p$, which extends into a wide slot in the plate below. These guides prevent the valve moving laterally to any great extent, but allow such play that there is practically no friction on the guides, the pressure of the water maintaining each valve upon its face-plate. These valves are set according to the discharge by a piston, G, moving in a cylinder, H, secured to the partition $f$, one end of the cylinder communicating around the stem $q$ of the piston with the chamber X and the other end through a tube, $r$, with the chamber X'.

A curved weighted lever, I, is pivoted at $y$ to some part of the case, and is provided with crank-arms S', which carry a cross-bar, I', extending through notches in the blades $p$ $p$, and in the piston-stem $q$, and tends by its descent to draw back the valves and maintain them in a position to close the tubes D D' with the piston at the left-hand end of the cylinder. So long as the discharge is closed or nearly closed the position of the parts will not be varied; but when the outlet is opened so as to withdraw the water from the chamber X' faster than it is supplied, there will be an excess of pressure on the outer or left face of the piston, the latter will slide to the right, tilt the lever I, and move the valves to uncover to a greater or less extent the tubes D D', thus permitting the water to flow into the chamber X' until the pressures are equalized, when the piston will remain in its position, shifting, however, and thus regulating the valve-openings with every change in the position of the discharge-cock. By this means the force of the streams that actuate the wheel C is proportioned to the amount of water drawn, and the velocity of the wheel increases with the increased discharge, insuring accuracy of measurement and registration.

I do not limit myself to the precise regulating device described, as others might be used—as, for instance, a flexible diaphragm in the partition $f$, or a cylinder containing a piston arranged vertically in said partition, and other devices.

I do not always arrange both valves to open to the same extent simultaneously, as one may be set ahead of the other, so that they will open in succession, and valve-cocks or rotating disks may be used in place of sliding valves.

As it is difficult to adjust any valve mechanism to operate accurately to regulate both large and small streams, such as result from slight leaks or partly-opened cocks or faucets, I use a supplemental passage, which will permit the flow of a very small stream of water without affecting the regulating mechanism, but securing registration. For this purpose I insert a small tube, J, in the partition $f$ and provide it with a perforated cap, $u$, (like the caps $h$,) to discharge a minute jet against the wheel C at such an angle as will propel the wheel somewhat faster than necessary to measure the actual quantity discharged, thereby affording a special inducement to consumers to arrest leaks and the dropping at faucets, which is ordinarily a source of great waste.

By the use of two independent motor streams, one of slight capacity to operate the registering mechanism and indicate the passage of small amounts of fluid, and the other automatically regulated to measure and register the main volume of fluid discharged, I avoid the inaccuracies in measurement which have hitherto resulted from the attempts to register both small and great discharges by the same means.

I transfer the motion of the spindle $d$ to the registering mechanism L by a spindle, N, which has a square or flattened lower end fitting a socket in the hub of one of the train of wheels M, gearing with a pinion on the spindle $d$. This permits the spindle N to be readily removed in taking the instrument apart.

To pack the spindle without creating undue friction, I provide the partition $f$ with a hollow stud, P, and between a shoulder of the latter and the top of the cap $A^4$, I interpose a packing, $w$, an extension of the stud projecting through an opening in the casing and carrying a screw follower and packing. The passage of fluid from the chamber X to the chamber X′ around the spindle is thus prevented, as is also the passage of fluid from the chamber X to that containing the registering mechanism.

I claim—

1. A fluid-meter provided with a bladed wheel gearing with the registering mechanism, with two or more independent passages of different sizes for injecting streams of water upon said wheel, and valves controlling the flow of water to the larger passage only, and an automatic device whereby the said larger passage is opened in proportion to the amount of water required, substantially as set forth.

2. The combination, with a fluid-meter provided with registering mechanism and a driving-wheel actuated by the passage of fluid through the meter, of a supplemental tube, affording a passage for a small stream, whereby the wheel is revolved when the main passage is closed, for the purpose set forth.

3. The combination, in a meter, with one or more valves controlling the main fluid-passage, of a regulating device communicating with the chambers connected by such passage, and provided with a piston and with openings whereby the pressure of fluid in the two chambers is brought upon opposite sides of the piston, for the purpose set forth.

4. The combination, in a meter, of registering devices operated by a stream flowing through the meter, a valve controlling the said stream, and an independent regulating device connected to said valve and constructed to be operated by the varying pressure in the meter, as set forth.

5. The combination of the valves E, controlling the main fluid-passages, and the cylinder, piston, and ports by which communications are established between the opposite ends of the cylinder and the chambers connected by said passages, and a weighted lever connected to the valves and piston, substantially as set forth.

6. The combination, in a fluid-meter, of the valves regulating the flow of fluid between the chambers connected by the main passages, an operating-wheel, C, and an independent tube, J, connecting the chambers, substantially as set forth.

7. The combination, with the tubes through which the operating-streams are injected upon the register-operating wheel, of adjustable nozzles and devices extending to the outside of the case and constructed to move said nozzles, substantially as described.

8. The case $A^2$, provided with a hollow stud, P, in combination with the perforated case $A^4$, packing $w$, arranged between a shoulder on the stud and the top of the case $A^4$, and screw-cap and packing upon the upper end of the stud, all in combination with the spindle N, driving-wheel and train, and registering devices, as specified.

In testimony whereof I have signed my name to this specification in the presence of two subscribing witnesses.

JONATHAN JOHNSON.

Witnesses:
W. J. NEWTON,
A. E. S. HANSMANN.